United States Patent
Park et al.

(10) Patent No.: US 12,505,756 B2
(45) Date of Patent: Dec. 23, 2025

(54) CESSATION CAST-OFF BLOODSTAIN PATTERN GENERATOR AND METHOD OF GENERATING CESSATION CAST-OFF BLOODSTAIN PATTERN USING THE SAME

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Byung Seon Moon, Busan (KR); Jae Mo Goh, Seoul (KR); Jin Pyo Kim, Daejeon (KR); Young Il Seo, Wonju-si (KR); Eunah Joo, Wonju-si (KR); Jehyun Lee, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 832 days.

(21) Appl. No.: 17/848,623

(22) Filed: Jun. 24, 2022

(65) Prior Publication Data
US 2023/0326364 A1    Oct. 12, 2023

(30) Foreign Application Priority Data
Apr. 11, 2022    (KR) .......................... 10-2022-0044605

(51) Int. Cl.
*G09B 19/00*    (2006.01)

(52) U.S. Cl.
CPC .................................... *G09B 19/00* (2013.01)

(58) Field of Classification Search
CPC ....................................................... G09B 19/00
USPC ............................................................ 434/219
See application file for complete search history.

(56) References Cited

U.S. PATENT DOCUMENTS

2019/0385487 A1    12/2019    Park et al.
2021/0132038 A1*    5/2021    Park ........................ G01N 33/49

FOREIGN PATENT DOCUMENTS

KR    10-2021-0055140 A    5/2021

OTHER PUBLICATIONS

Liscio et al, Observations and 3D Analysis of Controlled Cast-Off Stains. J Forensic Sci, 65: 1128-1140 (Year: 2020).*

(Continued)

*Primary Examiner* — Thomas J Hong
(74) *Attorney, Agent, or Firm* — Hauptman Ham, LLP

(57) ABSTRACT

A cessation cast-off bloodstain pattern generator includes: a body unit including an impact surface that a tool may hit; a shaft unit located to rotate about an arbitrary axis by having one end mounted on the body unit and the other end equipped with the tool; and an impact force measuring unit that is located on the impact surface, and measures an impact force when a tool applied with blood to an experimental site rotates and collides with the impact surface and the blood falls off.

8 Claims, 4 Drawing Sheets

(56) References Cited

OTHER PUBLICATIONS

Lee et al., Study on development of forensic blood substitute: focusing on bloodstain pattern analysis. Forensic Sci Int. (Year: 2020).*

Kabaliuk et al., Experimental validation of a numerical model, Forensic Sci Int 2014;245:107-20 (Year: 2014).*

Korean Office Action dated Mar. 13, 2024 for corresponding Korean Patent Application No. 10-2022-0044605, along with English machine translation (9 pages).

* cited by examiner

CESSATION CAST-OFF BLOODSTAIN PATTERN GENERATOR AND METHOD OF GENERATING CESSATION CAST-OFF BLOODSTAIN PATTERN USING THE SAME

CROSS-REFERENCE TO RELATED APPLICATION

This application claims the benefit of Korean Patent Application No. 10-2022-0044605, filed on Apr. 11, 2022, in the Korean Intellectual Property Office, the disclosure of which is incorporated herein in its entirety by reference.

BACKGROUND

1. Field

One or more embodiments relate to a cessation cast-off bloodstain pattern generator and a method of generating a cessation cast-off bloodstain pattern using the same.

2. Description of the Related Art

In criminal cases, bloodstain pattern analysis plays an important role in reconstructing the scene of bloodshed.

Among bloodstain types, scattered bloodstains, which are formed by splashing blood, are important bloodstains that can be used to determine the act of hitting.

Among scattered bloodstains, a cessation cast-off bloodstain pattern is a bloodstain generated when a perpetrator swings a blood-stained tool at the victim and stops the tool, the blood falls from the tool and attaches to a surface such as a wall.

Because the cessation cast-off bloodstain pattern is generated by radially scattering blood drops from objects such as crime tools, it is easy to morphologically be confused with other scattered bloodstains (bloodstains caused by actions such as hitting a bleeding area, bloodstains generated by injecting from the respiratory tract, etc.).

Therefore, it is important to establish objective criteria for determining a cessation cast-off bloodstain pattern. In order to establish objective criteria for determination in various surfaces and situations, a device for experimentally generating a cessation cast-off bloodstain pattern is needed.

SUMMARY

One or more embodiments include a cessation cast-off bloodstain pattern generator and a method of generating a cessation cast-off bloodstain pattern using the cessation cast-off bloodstain pattern generator. In more detail, one or more embodiments include a device and a method of experimentally generating a cessation cast-off bloodstain pattern, which is a bloodstain generated when a perpetrator swings a blood-stained tool at a victim and stops the tool, the blood falls from the tool and attaches to a surface such as a wall.

One or more embodiments include a device and a method of experimentally generating a cessation cast-off bloodstain pattern considering types of tools that a perpetrator may use, a rotation speed when the perpetrator swings the tools, and an impact force when hitting a victim with the tools.

According to one or more embodiments, a cessation cast-off bloodstain pattern generator includes: a body unit including an impact surface that a tool may hit; a shaft unit located to rotate about an arbitrary axis by having one end mounted on the body unit and the other end equipped with the tool; and an impact force measuring unit that is located on the impact surface, and measures an impact force when a tool applied with blood to an experimental site rotates and collides with the impact surface and the blood falls off.

In an embodiment, the cessation cast-off bloodstain pattern generator may further include a fixing jig connecting and fixing the shaft unit and the tool.

In an embodiment, an accommodating space may be formed inside the shaft unit in a longitudinal direction of the shaft unit, and the tool may be inserted and fixed in the accommodating space.

In an embodiment, the cessation cast-off bloodstain pattern generator may further include an input unit configured to receive an input signal according to operation information input by a user, and a control unit configured to control movement of the shaft unit according to the input signal received by the input unit.

In an embodiment, the operation information may include a rotation speed of the shaft unit.

According to one or more embodiments, a method of generating a cessation cast-off bloodstain pattern using a cessation cast-off bloodstain pattern generator includes: fixing a tool to a shaft unit of the cessation cast-off bloodstain pattern generator including a body unit, a shaft unit, and an impact force measuring unit, and positioning the tool at a starting point; applying blood to an experimental site of the tool; generating a cessation cast-off bloodstain pattern by rotating the shaft unit to apply an impact to the tool; and confirming an impact force measured by the impact force measuring unit.

In an embodiment, the cessation cast-off bloodstain pattern generator may further include an input unit and a control unit, and the generating of the cessation cast-off bloodstain pattern may include: inputting operation information into the input unit by a user; and generating a cessation cast-off bloodstain pattern by operating the cessation cast-off bloodstain pattern generator by the control unit according to the input operation information.

In an embodiment, the operation information may include a rotation speed of the shaft unit.

In an embodiment, the method of generating a cessation cast-off bloodstain pattern using a cessation cast-off bloodstain pattern generator may further include: analyzing the generated cessation cast-off bloodstain pattern.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
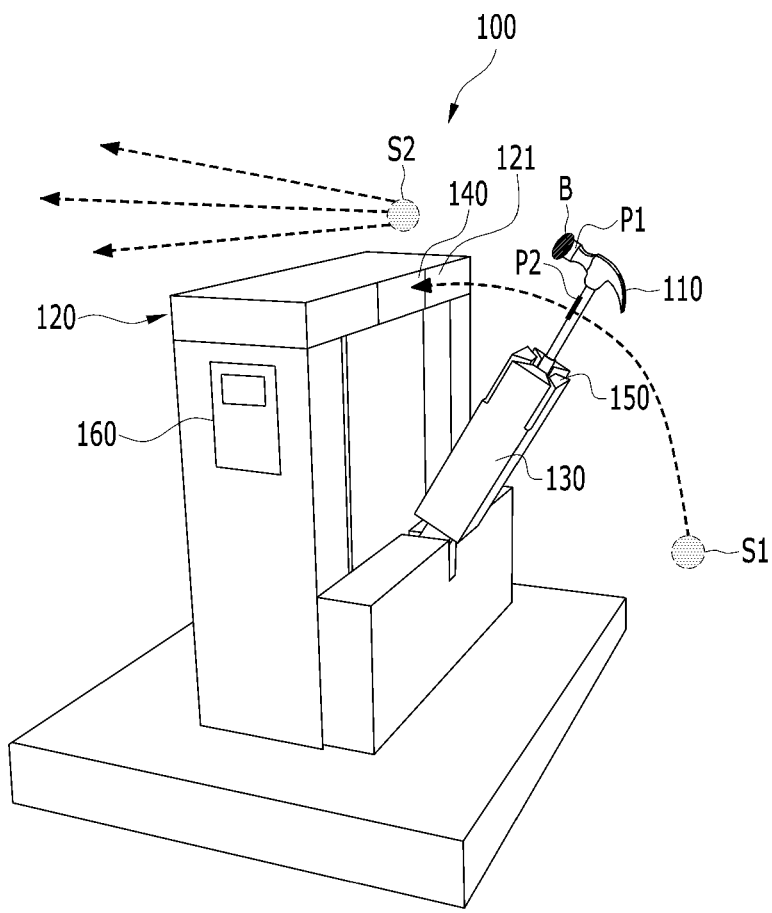
FIG. 1 is a schematic exemplary view of a cessation cast-off bloodstain pattern generator according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist, such that the layer, region, or component may be indirectly connected to the portion.

As used herein, 'cessation cast-off bloodstain pattern' is a type of cast-off bloodstain patterns, and refers to a bloodstain generated by a blood drop that falls due to the principle of inertia when a bloody object stops moving.

The 'cessation cast-off bloodstain pattern' may be generated in the following cases. First, the cessation cast-off bloodstain pattern may be generated when a perpetrator suddenly stops movement of a crime tool due to the victim's defense when hitting a victim. Second, the cessation cast-off bloodstain pattern may be generated when a perpetrator stops movement due to limitation of the shoulder joint when the perpetrator lifts a crime tool to hit a victim several times.

Hereinafter, a cessation cast-off bloodstain pattern generator according to an embodiment will be described with reference to FIGS. 1 to 3.

Figure 2:
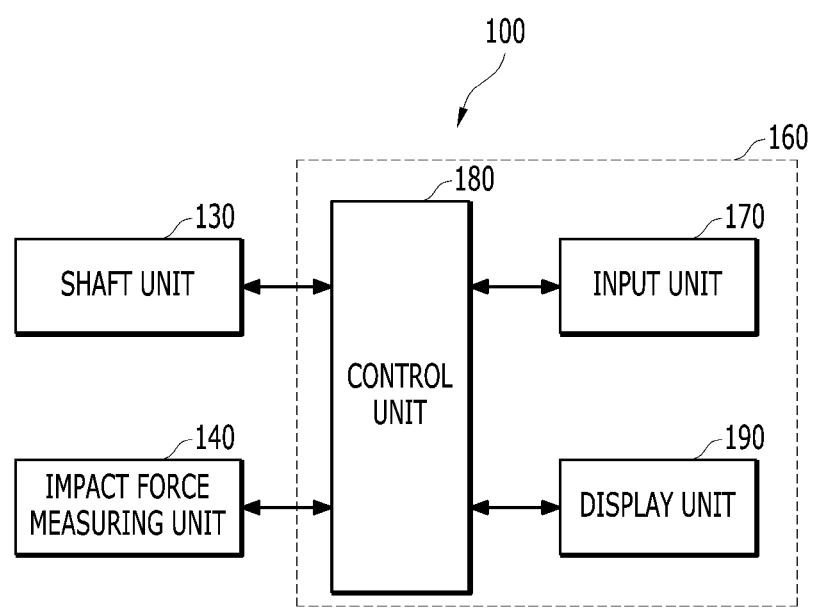
FIGS. 2 and 3 are schematic block diagrams of a cessation cast-off bloodstain pattern generator according to an embodiment.
Figure 3:
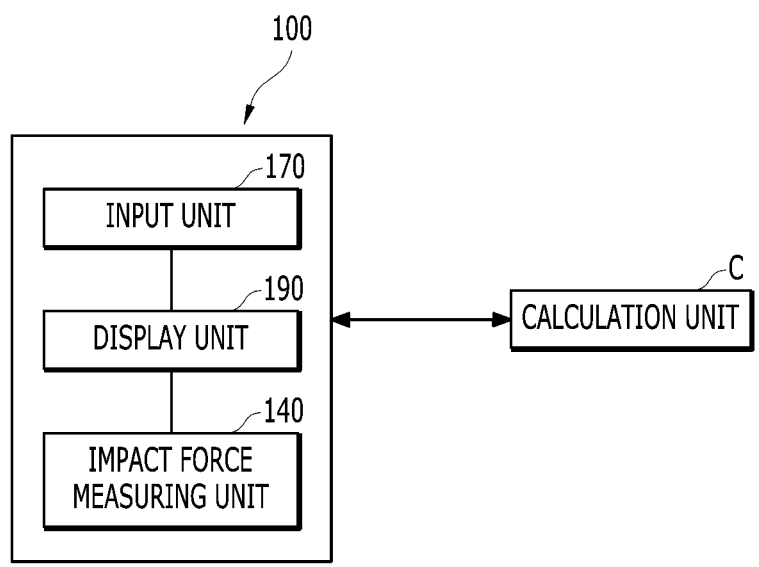

FIG. 1 is a schematic exemplary view of a cessation cast-off bloodstain pattern generator according to an embodiment, and FIGS. 2 and 3 are schematic block diagrams of a cessation cast-off bloodstain pattern generator according to an embodiment.

Referring to FIGS. 1 to 3, a cessation cast-off bloodstain pattern generator 100 according to an embodiment may include a body unit 120, a shaft unit 130, an impact force measuring unit 140, an input unit 170, a control unit 180, and a display unit 190.

The body unit 120 may include an impact surface 121 that a tool 110 may hit.

For example, the body unit 120 may have a three-dimensional shape in which the impact surface 121 that the tool 110 may hit is formed, as shown in FIG. 1.

In this case, the tool 110 may include a knife, a hammer, a hatchet, a spanner, a baseball bat, etc. that may be used as a crime tool at the scene of bloodshed. A user may select and use a different type of tool 110 according to the purpose of the experiment.

One end of the shaft unit 130 is mounted on the body unit 120, and the other end of the shaft unit 130 is equipped with the tool 110 so that the shaft unit 130 may be located to rotate about an arbitrary axis.

As an embodiment, an accommodating space may be formed inside the shaft unit 130 in a longitudinal direction of the shaft unit 130, and the tool 110 may be inserted and fixed in the accommodating space. Accordingly, the tool 110 may be fixed to the shaft unit 130 and located to rotate simultaneously with the rotation of the shaft unit 130. In this case, an experimental site P1 and an impact site P2 of the tool 110 are located outside the shaft unit 130.

However, in order to mount the tool 110 on the other end of the shaft unit 130, the shape of the shaft unit 130 is not limited to a specific shape. The shape of the shaft unit 130 is not limited to a specific shape as long as the tool 110 is fixed to the shaft unit 130 so that the experimental site P1 of the tool 110 is soaked with blood B and the tool 110 collides with the impact surface 121. In addition, a method of fixing the tool 110 to the shaft unit 130 is not limited.

In addition, according to an embodiment, the cessation cast-off bloodstain pattern generator 100 may further include a fixing jig 150.

The fixing jig 150 may be located at a connection portion between the shaft unit 130 and the tool 110 to connect and fix the shaft unit 130 and the tool 110.

For example, after inserting the tool 110 into an accommodating space located inside the shaft unit 130, the tool 110 may be fixed to the shaft unit 130 through the fixing jig 150. Because various tools 110 may be used according to the purpose of the experiment, a user may easily fix the various tools 110 to the shaft unit 130 through the fixing jig 150.

The impact force measuring unit 140 may measure an impact force of the tool 110 as an experiment target. The impact force measuring unit 140 may be located on the impact surface 121 of the body unit 120 to measure an impact force that the impact surface 121 receives when the tool 110 collides with the impact surface 121 while moving.

For example, the impact force measuring unit 140 may include a load cell. The load cell is a sensor that converts force into a measurable output signal. When the tool 110 and the impact surface 121 meet each other by an impact, the impact force measuring unit 140 may sense an impact force and measure the magnitude of the impact force.

The input unit 170 is a unit for receiving an input signal for controlling or operating the cessation cast-off bloodstain pattern generator 100 according to operation information input by a user, and may be implemented as various types of input units. For example, the input unit 170 may include a keyboard, a key pad, a touch pad, a jog wheel, a jog switch, and the like, but is not limited thereto.

The operation information may include a rotation speed of the shaft unit 130 in addition to information about the general operation of the cessation cast-off bloodstain pattern generator 100.

By adjusting the rotation speed of the shaft unit 130, a user may accurately reproduce the speed at which a perpetrator swings a crime tool at the scene of a crime.

The control unit 180 may control all operations of the cessation cast-off bloodstain pattern generator 100. The control unit 180 may be implemented in various forms such as a central processing unit (CPU), a processor, a microprocessor, an application processor (AP), a micro controller unit (MCU), a microcomputer, or a mini computer. In addition, the control unit 180 may control movement of the shaft unit 130 according to an input signal received by the input unit 170.

The display unit 190 may display all operating states of the cessation cast-off bloodstain pattern generator 100. For example, the display unit 190 may display operation information input by a user as described above, and may display an impact force measured by the impact force measuring unit 140 after the impact of the tool 110.

The cessation cast-off bloodstain pattern generator 100 according to an embodiment may derive a correlation between the rotation speed of the shaft unit 130 input by a user and an impact force measured by the impact force measuring unit 140 through a calculation unit C. The calculation unit C may receive an input value or an impact force measurement value from the input unit 170 or the impact force measuring unit 140, may calculate the correlation between the rotation speed of the shaft unit 130 and the impact force as a relational expression by a formula, or may visually represent each relationship as a graph using a program such as LabVIEW.

The display unit 190 may display a calculation result of the calculation unit C as described above.

The cessation cast-off bloodstain pattern generator 100 according to an embodiment may form the input unit 170, the control unit 180, and the display unit 190 into one control panel 160.

The control panel 160 may perform the function of the control unit 180 operating the cessation cast-off bloodstain pattern generator 100 according to an input signal received by the input unit 170 while performing the function of the input unit 170 receiving a user's touch input signal. In addition, the control panel 160 may also perform the function of the display unit 190 to display operation information input by a user, an operation state of the cessation cast-off bloodstain pattern generator 100, and the like. The control panel 160 may be formed on one side of the body unit 120 to provide convenience in operation and transportation of a user.

Figure 4:
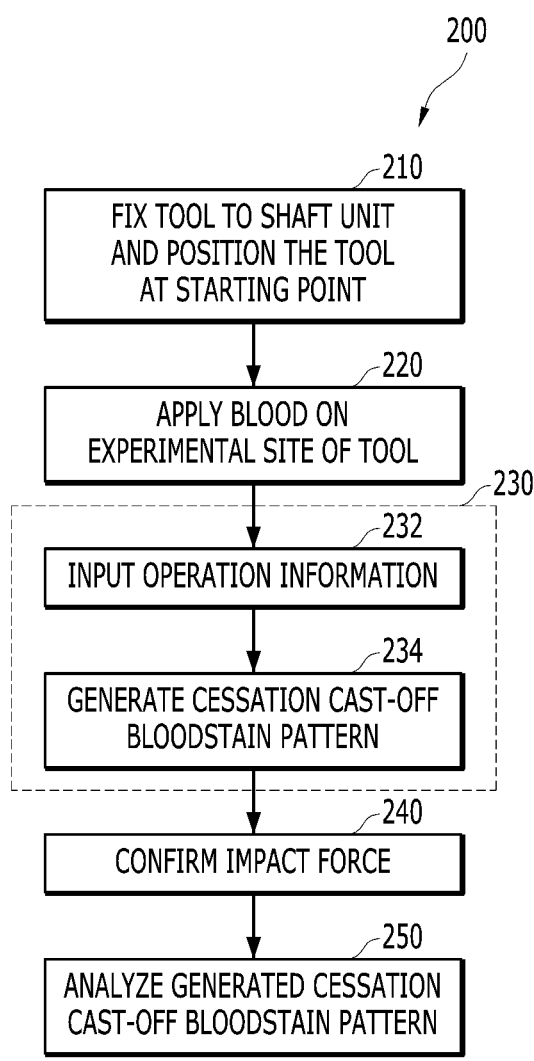
FIG. 4 is a flowchart illustrating a method of generating a cessation cast-off bloodstain pattern using a cessation cast-off bloodstain pattern generator according to an embodiment.

Hereinafter, a method 200 of generating a cessation cast-off bloodstain pattern using the cessation cast-off bloodstain pattern generator 100 according to an embodiment will be described with reference to FIG. 4. FIG. 4 is a flowchart illustrating the method 200 of generating a cessation cast-off bloodstain pattern using the cessation cast-off bloodstain pattern generator 100 according to an embodiment.

The cessation cast-off bloodstain pattern generator 100 according to an embodiment may include the body unit 120, the shaft unit 130, and the impact force measuring unit 140, and may further include the input unit 170, the control unit 180, and the display unit 190.

Operation 210 is fixing the tool 110 to the shaft unit 130 of the cessation cast-off bloodstain pattern generator 100 according to an embodiment and positioning the tool 110 at a starting point S1.

As an embodiment, the shaft unit 130 may have an accommodating space formed therein in a longitudinal direction of the shaft unit 130, and the tool 110 may be inserted and fixed in the accommodating space. The shaft unit 130 and the tool 110 may be connected to each other through the fixing jig 150 to be fixed.

The starting point S1 is a point at which the tool 110 is located when rotational motion of the shaft unit 130 starts.

The starting point S1 may be located at a point where the shaft unit 130 located at one end of the body unit 120 is rotated by a certain angle.

Operation 220 is applying blood B on the experimental site P1 of the tool 110.

The experimental site P1 of the tool 110 is a site that may cause bleeding in a victim when a perpetrator swings the tool 110 to hit the victim. For example, the experimental site P1 of the tool 110 may correspond to a blade portion in the case of a knife, a hammer, or the like.

When the tool 110 fixed to the shaft unit 130 rotates and collides with the impact surface 121, the experimental site P1 of the tool 110 may be located above the impact site P2 of the tool 110. The impact site P2 of the tool 110 is a portion where the tool 110 collides with the impact surface 121 of the body unit 120 when the shaft unit 130 rotates.

The blood B used at this time is real human blood or artificial blood. In the case of artificial blood, it is desirable to use artificial blood having similar physical properties to those of actual human blood.

Operation 230 is generating a cessation cast-off bloodstain pattern by rotating the shaft unit 130 to apply an impact to the tool 110.

In this case, operation 230 may include operations 232 and 234.

In operation 232, a user inputs operation information into the input unit 170. The operation information may include information about the general operation of the cessation cast-off bloodstain pattern generator 100 and the rotation speed of the shaft unit 130.

Operation 234 may include generating a cessation cast-off bloodstain pattern by operating the cessation cast-off bloodstain pattern generator 100 by the control unit 180 according to the input operation information.

When an impact is applied to the tool 110 by rotating the shaft unit 130, the blood B applied to the experimental site P1 of the tool 110 may fall off at a position S2 higher than the position of the impact surface 121 of the body unit 120. The blood B applied to the experimental site P1 of the tool 110 may fall off and be spread on the surrounding wall or floor to form bloodstains.

Operation 240 is confirming an impact force measured by the impact force measuring unit 140.

Upon impact of the tool 110, a cessation cast-off bloodstain pattern may be generated, and an impact force may be measured by the impact force measuring unit 140. At this time, the measured impact force may be confirmed through the display unit 190.

Operation 250 is analyzing the generated cessation cast-off bloodstain pattern.

In consideration of the operation information input by the user and the measured impact force, the cause of the victim's bleeding may be clearly identified at the scene of bloodshed by analyzing the shape of the generated cessation cast-off bloodstain pattern.

According to embodiments, the scene of bloodshed may be accurately reproduced considering types of tools that a perpetrator may use, a rotation speed when the perpetrator swings the tools, and an impact force when hitting a victim with the tools.

In addition, according to embodiments, because a cessation cast-off bloodstain pattern generated at the scene of bloodshed may be experimentally reproduced, the scene of a violent crime such as a murder may be reproduced and analyzed more accurately and reliably.

It should be understood that embodiments described herein should be considered in a descriptive sense only and not for purposes of limitation. Descriptions of features or aspects within each embodiment should typically be considered as available for other similar features or aspects in other embodiments. Therefore, the scope of the disclosure is defined by the appended claims.

What is claimed is:

1. A cessation cast-off bloodstain pattern generator comprising:
   a body housing;
   an impact surface located on an upper region of a side wall of the body housing;
   an impact tool configured to apply an impact to the impact surface, wherein the impact tool includes at least one of a knife, a hammer, a hatchet, a spanner, or a bat;
   a shaft member configured to rotate about an arbitrary axis extending in a direction perpendicular to a longitudinal direction of the shaft member, one end of the shaft member being mounted on a lower region of the side wall of the body housing and the other end equipped with the impact tool; and
   an impact force sensor located on the impact surface, and configured to measure an impact force of the impact when blood is applied to an experimental site at a working end of the impact tool, and a portion of the impact tool below the working end rotates and collides with the impact surface, causing the blood to fall off,
   wherein an accommodating space is formed inside the shaft member in the longitudinal direction of the shaft member, and the impact tool is removably inserted and fixed in the accommodating space so as to be replaceable with an other impact tool.

2. The cessation cast-off bloodstain pattern generator of claim 1, further comprising:
   a fixing jig configured to connect and fix the shaft member and the impact tool.

3. The cessation cast-off bloodstain pattern generator of claim 1, further comprising:
   an input device comprising one or more input interfaces configured to receive an input signal according to operation information input by a user; and
   a processor configured to control movement of the shaft member according to the input signal received by the input device.

4. The cessation cast-off bloodstain pattern generator of claim 3, wherein
   the operation information comprises a rotation speed of the shaft member.

5. A method of generating a cessation cast-off bloodstain pattern using the generator of claim 1, the method comprising:
   fixing the impact tool to the shaft member, and positioning the impact tool at a starting point;
   applying the blood to the experimental site of the impact tool;
   generating a cessation cast-off bloodstain pattern by rotating the shaft member to apply the impact to the impact tool; and
   confirming the impact force measured by the impact force sensor.

6. The method of claim 5, wherein the cessation cast-off bloodstain pattern generator further comprises an input device and a processor, and
   the generating of the cessation cast-off bloodstain pattern comprises:
      inputting operation information into the input device by a user; and
      generating the cessation cast-off bloodstain pattern by operating the cessation cast-off bloodstain pattern generator by the processor according to the input operation information.

7. The method of claim 6, wherein the operation information comprises a rotation speed of the shaft member.

8. The method of claim 5, further comprising:
   analyzing the generated cessation cast-off bloodstain pattern.

* * * * *